United States Patent [19]

Cascone et al.

[11] Patent Number: 4,524,581

[45] Date of Patent: Jun. 25, 1985

[54] METHOD FOR THE PRODUCTION OF VARIABLE AMOUNTS OF POWER FROM SYNGAS

[75] Inventors: Ronald F. Cascone; C. Ashley Solomon, both of New York, N.Y.

[73] Assignee: The Halcon SD Group, Inc., New York, N.Y.

[21] Appl. No.: 598,758

[22] Filed: Apr. 10, 1984

[51] Int. Cl.³ .............................................. F02C 3/28
[52] U.S. Cl. .................................... 60/39.02; 60/39.12
[58] Field of Search ............... 60/39.02, 39.12, 39.182, 60/39.465; 423/415 A, 247; 560/232; 562/519; 568/876

[56] References Cited

U.S. PATENT DOCUMENTS

| | | | |
|---|---|---|---|
| 3,716,619 | 2/1973 | Lynn et al. | 423/247 |
| 3,816,513 | 6/1974 | Wakamatsu | 560/232 |
| 3,986,349 | 10/1976 | Egan | 60/39.02 |
| 4,092,825 | 6/1978 | Egan | 60/39.02 |
| 4,094,148 | 6/1978 | Nelson | 60/652 |
| 4,189,925 | 2/1980 | Long | 60/652 |
| 4,199,327 | 4/1980 | Hempill et al. | 60/39.02 |
| 4,216,339 | 8/1980 | Coutesu et al. | 560/232 |
| 4,277,416 | 7/1981 | Grant | 518/703 |
| 4,303,630 | 12/1981 | Sano et al. | 423/415 A |
| 4,341,069 | 7/1982 | Bell et al. | 60/39.02 |

FOREIGN PATENT DOCUMENTS 2075124 11/1981 United Kingdom ............... 60/39.12

OTHER PUBLICATIONS

Brown et al., "Economic Evaluation of the Coproduction of Methanol and Electricity with Texaco Gasification Combined-Cycle Systems", Research Report AP-2212, prepared by Electric Power Research Institute, Palo Alto, Calif., Jan., 1982.

Primary Examiner—Louis J. Casaregola
Attorney, Agent, or Firm—William C. Long; Riggs T. Stewart; Daniel R. Zirker

[57] ABSTRACT

A process for the production of variable amounts of electric power from a syngas feedstock is disclosed. The process captures, stores and releases carbon monoxide by forming and dissociating a suitable organic molecule, i.e., an alkyl formate, and thereby exploits the natural stoichiometry of the coal conversion to greatest advantage.

27 Claims, 6 Drawing Figures

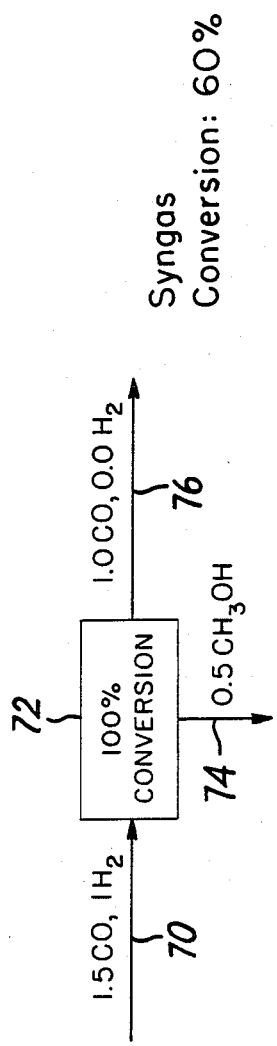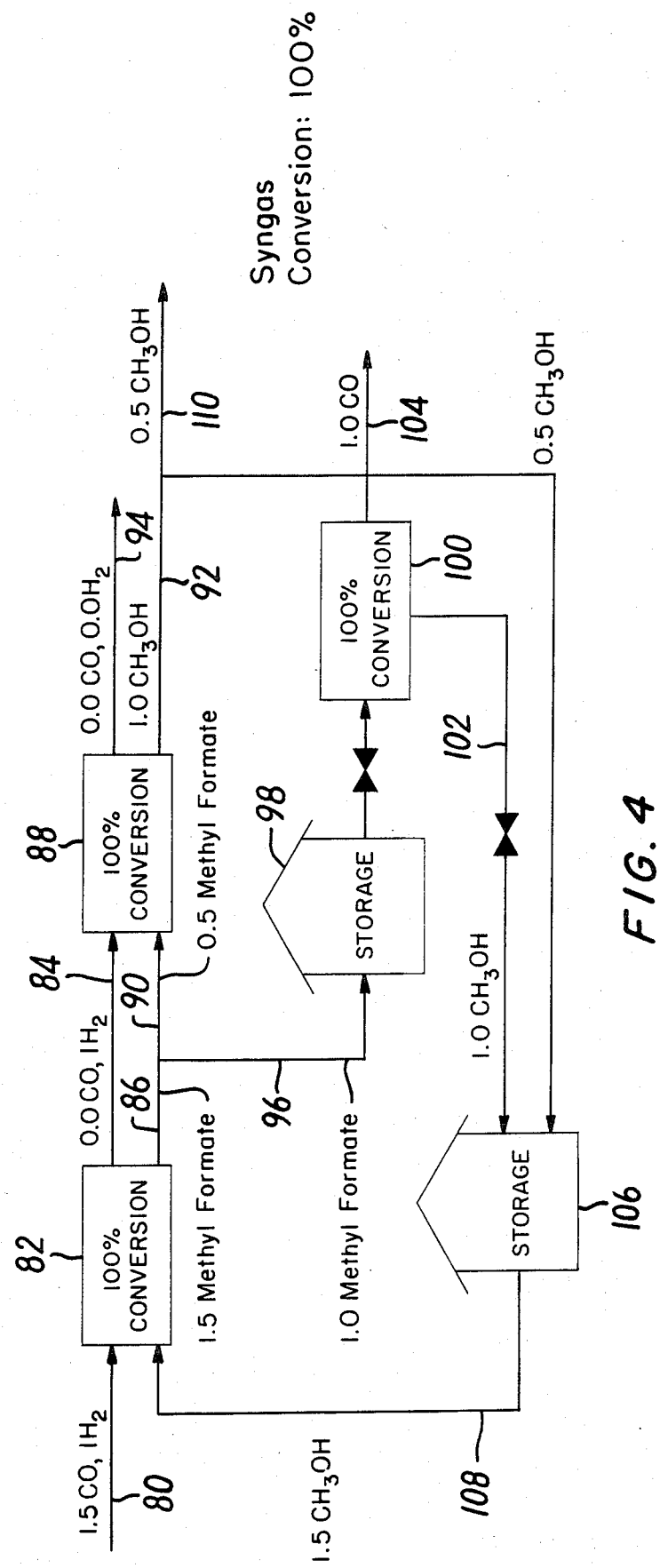

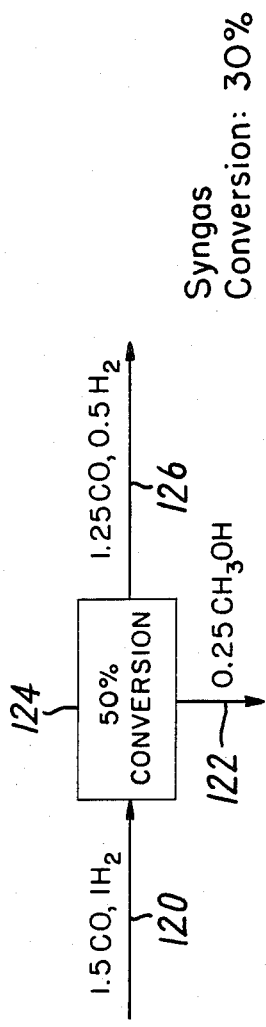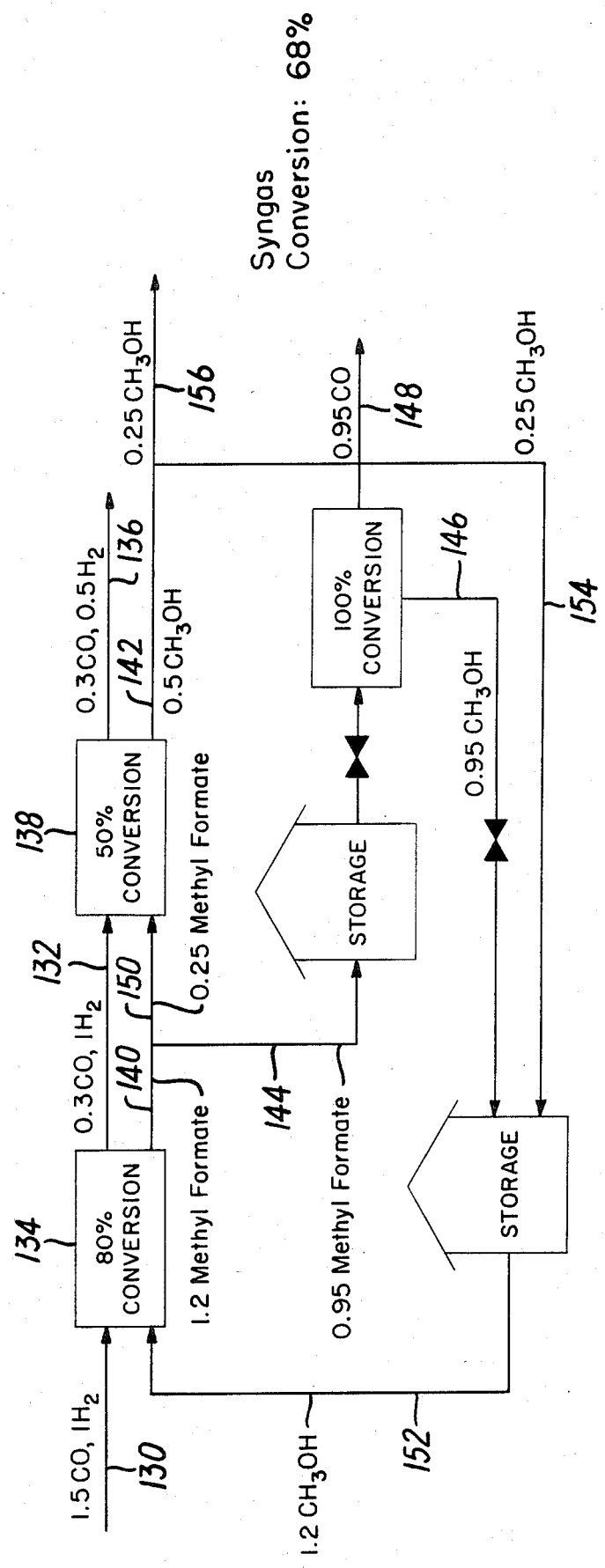
FIG. 5
FIG. 6

METHOD FOR THE PRODUCTION OF VARIABLE AMOUNTS OF POWER FROM SYNGAS

BACKGROUND OF THE INVENTION

1. Field of the Invention

This invention relates to the production of regularly varying amounts of electric power, and more particularly, to the conversion of carbonaceous materials such as coal, into both gaseous and liquid fuels which can be effectively utilized so as to generate variable amounts of electric power for both industrial and utility needs. This invention also relates to the capture, storage and release of carbon monoxide by forming and dissociating a suitable organic molecule, i.e., an alkyl formate, to exploit the natural stoichiometry of the coal conversion to greatest advantage.

2. Discussion of the Prior Art

Electric power production and distribution grids can generally be characterized as needing to respond to power demand patterns which vary over time. Such demand patterns generally can cyclically rise and fall over daily, weekly and even annual periods, with the precise degree of variation being substantially different in various localities. It is not uncommon for the base load and peak load facilities of a utility grid to use different technologies and or fuels.

As is well known to those in the art, current conventional electric power generation plants frequently utilize fuel oil or natural gas as the sources of energy for the generation of electrical power. However, these fuels, which are particularly attractive for supplying increased electric power during peak demand periods, are no longer as inexpensive and in such plentiful supply as they have been in the past. Now, due to the high cost of crude petroleum, refined petroleum products and natural gas, as well as the unreliability of the sources of these fuels, it has become necessary that different energy sources be explored and new techniques for the effective utilization of both old and other sources of energy be developed. Coal, which is in great abundance and is relatively inexpensive, is a natural material for the art to investigate as a primary energy source for the generation of electric power.

Originally the primary source of heat to generate electric and mechanical power, coal had fallen out of favor due both to the problems involved in handling, transport and storage, as well as its content of ash, sulfur and other impurities which can create environmental and other emissions control problems. But now, because of its lower cost and more secure domestic supply, coal is returning to favor, and more efficient and cleaner means of utilization are under investigation.

Coal is usually combusted with air, with the heat of reaction produced used to generate a high pressure steam which is expanded in a turbine to generate mechanical or electrical energy. The electric industry has developed a variety of large, highly efficient generators which can be driven by expanding steam. Coal fired steam generators, however, are not well suited for producing greatly varying amounts of electricity, but rather are usually designed for more of a base (substantially constant) load. Coal combustors are also poorly suited to interrupted requirements. Usually they are preferred for base load operations because of the lower fuel cost. Recently, to provide peak load and reserve load demands, open-cycle gas turbines using liquid or gaseous hydrocarbon fuels have often been utilized due to their quick startup capability and relatively low capital cost.

Gas turbines presently require a clean burning fuel which is non-corrosive to the turbine blades, and unfortunately some carbonaceous fuels are corrosive. Similar problems have also arisen from the burning of soot and ash producing liquid petroleum products.

Coal and other solid carbonaceous materials, as mentioned above, further contain a substantial amount of sulfur compounds, the combustion of which creates serious environmental problems. Since enormous volumes of low pressure gas are produced in the combustion of these sulfurbearing coals, it is very expensive to remove the polluting sulfur compounds such as $SO_2$ and $SO_3$ following combustion. These and other problems have thus spurred the search for coal gasification processes which will produce a clean fuel gas in which the sulfur compounds have been removed from the fuel prior to combustion. Coal can be gasified with the resulting gasification products (syngas) cleaned and used to power gas turbines, which are easily implemented to the production of electric power. However, the gasification processes usually produce a syngas possessing a much lower heating value than clean natural gas. With its high heating value, natural gas is also economical for long range distribution and the present pipeline system provides a reservoir for meeting demand variations. The alternative solution of producing large on-site gasification and associated power generation plants has not appeared to be economical for producing widely variable amounts of fuel needed for peak load generation of power, since it is too expensive to store such gaseous products and too large a capital expense to provide for such greatly increased gas production rate for peak load demand.

One attempt the art has proposed to satisfy the requirements of clean power production coupled with variable power demands is disclosed in Report AP-2212, "Economic Evaluation of the Co-production of Methanol and Electricity with Texaco Gasification Combined-Cycle Systems", of the Electric Power Research Institute (EPRI) Palo Alto, Calif., wherein a process of gasifying coal at a constant rate under high pressure and temperature is set forth. The process recovers waste heat for internal usage and cleans the raw syngas of sulfur compounds and other contaminants, followed by feeding the cleaned syngas to a so-called partial-conversion, "once-through" (no gas recycle) methanol synthesis reaction, with the unconverted syngas burned for direct base load power generation, thereby replacing more expensive, equivalently cleaned fuels. The synthesized methanol is stored and later used as fuel for gas turbine systems during the peak demand periods. Unfortunately, a once-through process is limited by both stoichiometry and process efficiency in the proportion of storable, clean fuel which can be extracted from the syngas. The gasification process produces a synthesis gas having, typically, a 1.2/1 ratio of CO to $H_2$, together with lesser amounts of $CO_2$, $H_2S$, methane and other inerts. Since the synthesis of methanol consumes two moles of $H_2$ per mole of CO it is readily apparent that even if $H_2$ conversion is complete, this stoichiometric requirement will limit the conversion of the syngas stream. Since only a limited fraction, typically about 50% of the available hydrogen is converted in the once-through methanol synthesis, the process will convert a maximum of only about 25% of the available syngas to a storable liquid methanol fuel. In the conventional production of methanol, the CO component of the syngas is partially shifted by reaction with water vapor in the well known water-gas reaction to produce $CO_2$ and additional $H_2$, to thereby arrive at the appropriate ½ ratio of $CO/H_2$ for the essentially complete conversion of the gas to methanol. This results in the loss of thermodynamic efficiency and also requires more capital equipment. This process uses a low conversion per pass reaction which requires a compressive recycle to react large volumes of unconverted gas. In the EPRI Report a once-through methanol synthesis is shown, when operated as part of a coal gasification combined cycle plant, to be a more economical means for a utility to obtain a supply of clean methanol for peak load power turbine fuel than by purchasing methanol produced from coal, or the like.

U.S. Pat. No. 3,868,817 discloses a process for the generation of mechanical and electrical power from a purified fuel gas produced from solid carbonaceous fuels. The purified fuel gas is used to generate power using gas turbines.

U.S. Pat. Nos. 3,986,349 and 4,092,825 disclose a process for generating electrical power from solid carbonaceous materials in open-cycle gas turbines to meet variable power demands. The process involves the conversion of coal to a combustible synthesis gas formed by its reaction with steam and oxygen. The synthesis gas is then divided into two portions, one of which is contacted with both Fischer-Tropsch and hydrogenation catalysts to produce a variety of synthetic hydrocarbons ranging from methane and ethane to $C_{22}$ or higher. The normally gaseous portion of the product is separated and recombined with the second portion of the synthesis gas stream, and the combined streams are subsequently combusted and utilized as fuels in an electricity-generating gas turbine. The normally liquid hydrocarbon products ($C_5$–$C_{22}$) are stored and also utilized as fuel for gas turbines to produce supplemental power for peak-load demand. This is a complex and torturous scheme, with substantial thermodynamic losses. Most of the reacted syngas is converted to a variety of products, only some of which are liquids. Water is also formed from CO and $H_2$ along with some oxygen-free hydrocarbons, resulting in a loss of potential fuel to the power system. Such a process is therefore unattractive for variable power production applications.

U.S. Pat. No. 4,341,069 disclosed a process for satisfying variable electrical power generation requirements through the use of coal to produce syngas and dimethyl ether, which are both fired in turbinecompressor arrangements driving electrical generators, wherein the storable ether fuel is used to supplement the base power load produced by the firing and expanding syngas in the appropriate gas turbine generator units. This route is also limited in flexibility by the large proportion of hydrogen to carbon monoxide in dimethyl ether, in cases of syngases produced from coal or similar carbonaceous feeds to gasification, which are more abundant in carbon monoxide than hydrogen.

U.S. Pat. No. 3,716,619 discloses the recovery of carbon monoxide from fuel gases for immediate release as a chemical synthesis feedstock. The process does not separate the homogeneous sodium methoxide catalyst from the alkyl formate solution produced, and thus the mixed reactor effluent would not be suitable for storage, since the CO would be spontaneously released under practical bulk storage conditions, in an undesired time period.

Processes disclosing the production of synthesis gas from coal which are useful in electric power generation plants are set forth in U.S. Pat. Nos. 4,094,143, 4,227,416 and 4,132,065.

The troublesome problems presented by widely variable power load demand, combined with the special fuel requirements necessary for clean, efficient and non-corrosive power generation units, are substantially avoided by the process of the invention, which combines the production of a base load power generating capability with the additional production from CO and lower alkyl alcohols such as methanol of an energy storing, simple molecular compound, i.e., alkyl formates, such as methyl formate, which are particularly useful in the efficient and economic generation of the necessary peak load power requirements, through the release of CO for use during periods of increased demand, as well as the regeneration of the alkyl alcohol, thereby permitting a continuous cycle of energy capture for release during peak demand periods.

SUMMARY OF THE INVENTION

Accordingly, a novel method for providing power to satisfy a variable demand through a coal gasification based process is set forth. A substantially combustible hydrocarbonaceous material such as coal, lignite, petroleum refining residue, or the like is gasified into a synthesis gas mixture, (CO and $H_2$), preferably in a substantially continuous manner, producing a $CO/H_2$ ratio ranging from about 3 to 1 to 1 to 3, most preferably about 2 to 1 to 1 to 1, through a suitable high temperature and pressure gasification process, e.g., the Texaco, Shell-Koppers or modified Koppers-Totzek processes. The resultant pressurized syngas is cleaned of impurities, gaseous sulfur compounds, e.g. $SO_2$, $H_2S$, and COS, and also, preferably, $CO_2$ and water vapor, then preferably concentrated in CO, by a "once through" methanol synthesis, or by utilization of a semi-permeable membrane concentration; the resultant prepared syngas, e.g., having a $CO/H_2$ ratio from about 10/1 to 1/1, is reacted and forms a liquid CO absorbing molecule product, preferably by reacting an alkyl alcohol, e.g., methanol, with the syngas and forming an alkyl formate, e.g., methyl formate; the CO absorbing molecule product, which is easily adaptable to catalytic forming and dissociating, is separated from the reactants and catalysts and passed to a suitable storage zone. In periods of power demand the CO absorbing molecule product, e.g., alkyl formate, either provides fuel for power for variable demand, or fuels other desired gas turbines by catalytically dissociating to CO and an alkyl alcohol, e.g., methanol. The formed alkyl alcohol is suitable as either peak load fuel or for storing for later process use, preferably as the alkyl alcohol feed for the forming of the alkyl formate. The exiting, now $H_2$ rich syngas can be either directly supplied to a gas turbine, or reacted to synthesize other fuels, or purified for other chemical and power production uses. Preferably the remaining syngas is reacted with a suitable amount of the alkyl formate product to produce additional alkyl alcohol, which preferably, is stored for later usage. The remaining syngas preferably is used to fuel the base load requirements, in one or more power generating gas turbines.

The combined process of this invention thus comprises a coal gasification operation producing a syngas possessing a wide range of possible $CO/H_2$ ratios, forming alkyl formates and alkyl alcohols from the catalytic reaction of the syngas with a suitable feedstock, utilizes the syngas product in combustion gas turbines to provide a substantially constant electric base power production, together with the subsequent use of the stored CO by dissociation of the CO storing molecule, preferably a member of the alkyl formates, such as methyl formate, and of any, preferably, stored alkyl alcohols, e.g. methanol, to satisfy peak load power requirements, thereby providing an integrated, highly efficient and environmentally clean operation for satisfying the greatly varying requirements of high, normal and low demand periods. The coal gasification, alkyl formate and alkyl alcohol synthesis operations can be continuously, reliably and efficiently carried out in a manner so as to both maximize the efficient yields of the energy resources while also minimizing the capital requirements necessary for operation. The dissociation reaction can be operated at variable rates so as to release a suitable amount of CO fuel when desired.

Such a novel combination provides a power generating operation of unusual flexibility, offers substantial economic advantages and is particularly responsive to present power variation requirements faced by electric power plants.

BRIEF DESCRIPTION OF DRAWINGS

FIGS. 3–6 describe and contrast the theoretical and actual process conversions obtained through the usage of both a simplified once through methanol synthesis and also the preferred methyl formate synthesis operation.

DETAILED DESCRIPTION OF THE INVENTION

This invention discloses a particularly useful process for storing and releasing chemical energy, i.e., CO, for use when desired. In the broadest embodiment of the invention, a carbon monoxide storing molecule, most preferably from the class of alkyl formates, is easily and reversibly formed and decomposed in the presence of at least one suitable catalyst, instead of relying solely on the production of methanol formed by the prior art. This result is achieved by feeding the processed syngas, preferably increased in CO concentration, to a synthesis unit in which the carbon monoxide present in the syngas reacts with a feed stream of alkyl alcohol, e.g. methanol, to form an alkyl formate product, e.g., methyl formate. Suitable alkyl alcohols include both linear and branched chain alcohols of about 1 to 10 carbons, with the preferred alcohol being methanol. In contrast to the prior art, such an operation is particularly adaptable for being combined with a variety of other related operations, such as a once-through methanol synthesis, alkyl formate hydrogenolysis and the like to convert a greater amount of syngas into a storable, liquid fuel. In such a manner, i.e., by storing and burning CO in combination with the other net hydrogencontaining fuels produced a high degree of flexibility can be achieved by matching the stoichiometry and conversion efficiency to the natural $CO/H_2$ ratio produced by any carbonaceous fuel gasification process. Additionally, such a process is achieved without complexity, e.g., with no gas recycle and with continuous synthesis reactions, and without the thermodynamic losses, e.g., no shift of CO to $H_2$, or production of oxygen free organic liquid compounds, found in several prior art processes.

Figure 1:
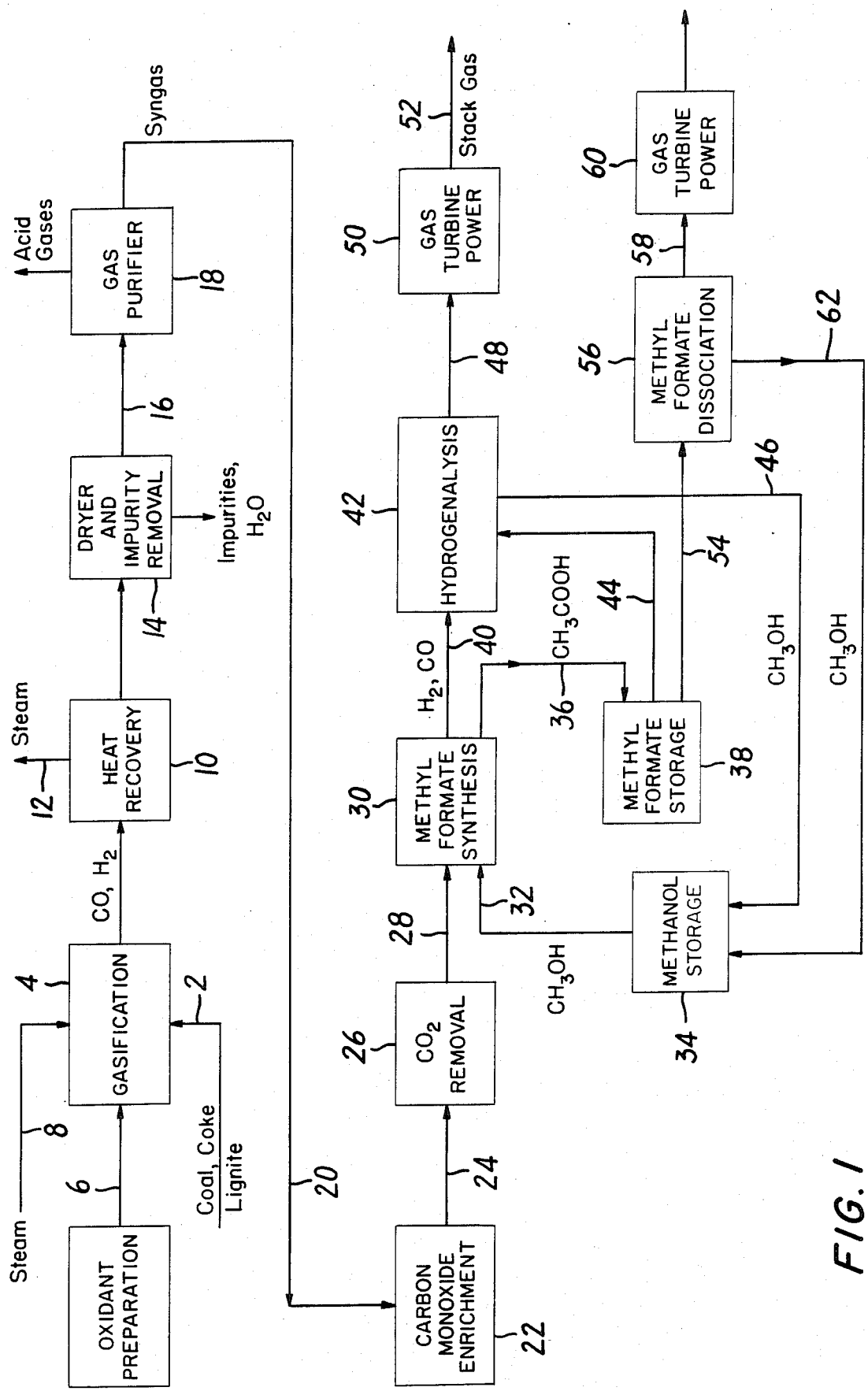
FIG. 1 illustrates a schematic flow diagram illustrating the preferred embodiment of the integrated process.

A better understanding of the invention can be facilitated by a careful consideration of the preferred process outline depicted in accompanying FIG. 1. In the embodiment set forth in the figure, coal and/or other combustible hydrocarbonaceous materials, which can include coke, lignite, oil shale, peat, biomass, petroleum refining residues and the like, are charged through conduit 2 to coal gasification unit 4, which is briefly described hereinafter. Oxygen, or another suitable gaseous stream containing substantial amounts of oxygen is charged through conduit 6 into gasifier 4, and steam, or, if preferred, liquid water is introduced through conduit 8 to the gasifier. The precise manner in which these ingredients are introduced into the gasifier is within the skill of the art; it is preferred that the process will be run continuously and at a substantially constant rate.

Any one of several commercially available gasification processes can be incorporated into the process. Gasifiers such as the Texaco, the modified Koppers-Totzek and the Shell-Koppers are preferred, with the precise choice depending on the particular feedstock and overall integrated system desired, despite the fact that they produce a syngas having a high exit temperature, which is believed detrimental for some coal gasification applications due to a tendency to reduce the conversion of coal energy to syngas heat values. However, combined cycle power plants have the capability of recovering and using at least some of the chemical energy converted to sensible heat (and otherwise lost) elsewhere in the power producing cycle, such as by recovering heat in unit 10 and generating high pressure steam leaving unit 10 through conduit 12. These gasifiers can be particularly useful in the process of this invention, since they provide a syngas product having a relatively low $CO/H_2$ ratio, i.e., from about 3 to 1 to 1 to 3, and preferably about 2 to 1 to 1 to 1, which is particularly preferred for the process of this invention. Additionally, such gasifiers produce a minimum amount of undesired light hydrocarbons.

The gasifiers contemplated for use in the process may be operated over a range of pressures and temperatures between about 15 to 1500 psia and 2000° to 3500° F., it being preferred to use pressures within the range of 600 to 1000 psia and temperatures between 2200° and 3000° F. The coal gasification product, or syngas, is then, in the broadest embodiment, prepared for a reaction to form a CO absorbing molecule with a suitable feedstock, e.g., an alkyl alcohol, in a synthesis zone. Such preparation usually includes removal of impurities, acid gas constituents, water vapor and the like, as well as concentrating the CO to create a more desired $CO/H_2$ ratio, although a wide variety of other steps may also be used. The syngas is preferably first processed by passing it to gas purifiers 14 and 18 wherein the entrained solids and other contaminants, and then a variety of sulfur containing and other common acid gases ($H_2S$, COS, $CO_2$, etc.) are removed, preferably by conventional methods. Upon exiting gas purifier 18, the cleaned, rich in carbon monoxide syngas is passed through conduit 20 to a methyl formate synthesis unit, which can also contain the necessary alkyl formate product separation apparatus. In the preferred embodiment the syngas stream is first enriched in CO in enrichment unit 22, which can be a "once through" methanol synthesis unit, or a unit for the removal of hydrogen from the syngas stream by diffusion through a gas semi-permeable membrane, or the like. After exiting CO enrichment unit through line 24, if necessary, any remaining gaseous sulfur compounds, $CO_2$ and water vapor that would be damaging to either the synthesis zone catalysts or reactants is removed in unit 26. The CO rich syngas, e.g. containing from about 10/1 to 1/1 $CO/H_2$, the higher CO ratios naturally being preferred, passes into the alkyl formate synthesis unit 30 through line 28 where it is contacted in the presence of a suitable catalyst with an alkyl alcohol feed stream 32 passed from an effective storage zone, i.e., alkyl alcohol storage unit 34, and reacts with the CO to easily form an alkyl formate product, which is separated from the reaction mixture, particularly from any catalysts present which are effective in promoting the reverse equilibrium reaction of CO dissociation, preferably using conventional separation techniques, and passed through line 36 to a suitable storage zone, storage unit 38.

There are currently several known processes for the synthesis of alkyl formates such as methyl formate from a syngas and alkyl alcohol feedstock. In addition to U.S. Pat. No. 3,716,619, they include U.S. Pat. No. 3,816,513, wherein carbon monoxide and methanol are reacted in either the liquid or gaseous phase to form methyl formate at elevated pressures and temperatures in the presence of an alkaline catalyst and sufficient hydrogen to permit carbon monoxide to be converted to methanol, and U.S. Pat. No. 4,216,339, in which carbon monoxide is reacted at elevated temperatures and pressures with a current of liquid reaction mixture containing methanol and either alkali metal or alkaline earth metal methoxide catalysts to produce methyl formate. However, in the broadest embodiment of this invention, any effective commercially viable process for the formation of a CO absorbing molecule product, preferably an alkyl formate from a feedstock comprising a corresponding alkyl alcohol and a prepared syngas sufficiently rich in carbon monoxide is within the scope of the invention.

The precise catalyst or catalysts chosen, as well as concentration, contact time, and the like, can vary widely, as is known to those skilled in the art. It is preferred to use the catalysts disclosed in U.S. Pat. No. 4,216,339, but a wide variety of other catalysts known to those in the art can also be used.

It is preferred, although not essential, to pass the now hydrogen rich syngas e.g., having about a 1/1000 to ⅓ $CO/H_2$ ratio, through conduit 40 after exiting alkyl formate synthesis unit 32 into hydrogenolysis unit 42, as well as an effective amount of alkyl formate product passed through conduit 44 from storage unit 38 to satisfy stoichiometric and conversion requirements. The two streams are contacted in hydrogenolysis unit 42 in the presence of an effective catalyst, and undergo the following equilibrium reaction, shown for the case of methyl formate, here favoring methanol production:

$$HCOOCH_3 + 2H_2 \rightleftharpoons 2CH_3OH$$

The unit can be operated at temperatures between about 200° to 650° F. and at pressures between about 150 to 1000 psia, although a variety of other conditions can be used, depending on whether it is a liquid or vapor phase reaction, to satisfy the equilibrium requirements. The methanol product is preferably separated by conventional distillation procedures and exits through conduit 46 to storage unit 34 for later usage. The remaining syngas passes from hydrogenolysis unit 42 through line 48 and enters power producing unit 50 preferably a gas turbine combined cycle unit, wherein it combusts with air, or another suitable oxygen containing gas. In the preferred power producing unit, the hot combustion gases are expanded to drive a gas turbine, and eventually produce electric power. The still hot waste gases are preferably contacted with water in a boiler to produce steam, which can be used to drive any steam turbogenerators included in the system to produce additional electricity. It is preferred that the continuous power produced in such a combined cycle, or, by a less efficient gas turbine open cycle arrangement or, in the broadest embodiment, any suitable gas turbine electricity production unit, function as the base load of the power plant and suffice for normal non peak hour operation. The clean, cooled stack gas exits through conduit 52 where it can be discharged to the atmosphere, although some remaining heat may be recovered and used as deemed advantageous in other units of the process. It is, of course, contemplated that such an arrangement, as disclosed herein, may be substantially modified according to the principles of this invention. For example, the $H_2$ rich syngas stream 40 exiting the alkyl formate synthesis unit 30, either alone or in combination with other $H_2$ rich streams, can instead be passed either directly to the gas turbine unit 50, or to a purification unit for preparation for other usages, such as a power generation fuel cell, or to a "once through" methanol synthesis unit, and the like, so as to make additional alkyl alcohol for storage, before entering the power producing unit 50.

Referring back to the gasifier unit 4, most conventional gasifiers generate a syngas product stream having a $CO/H_2$ ratio ranging from about 3 to 1 to 1 to 3. Most often, this ratio is more than 1.0 for higher efficiency gasifiers since there is less added water present to generate $H_2$ in situ. These gasifiers are preferred since such a ratio results in a sufficient amount of carbon monoxide present in the syngas stream, at the appropriate pressure, to be captured and form a CO storing molecule product, preferably a substantial amount of alkyl formate; consequently permitting a relatively large amount, e.g. at least 50% of the energy in the syngas, depending on the $CO/H_2$ ratio and other parameters, to be stored for later use as a power source. By the formation of net quantities of other compounds in separate additional steps involving syngas streams, the process is both particularly effective, as well as flexible in matching the precise $CO/H_2$ ratio presented by the selected gasification process. Such a result is possible because the alkyl formate reaction concentrates $H_2$ by removing CO and has a low pressure drop, thereby making feasible producing additional alkyl alcohol from syngas compounds in operations which require high $H_2$ concentrations in their feed syngas so that the fraction of syngas captured as a storage energy product in these steps can be maximized without resorting to a syngas shift or compression. Thus, through a unique combination of process steps a surprisingly large fraction of available gaseous fuel can be efficiently converted to a storage liquid form which can eventually be easily converted to power in a gasification based facility.

The alkyl formate product produced is preferably separated from the syngas and alkyl alcohol streams as well as from the reaction catalysts through condensation, distillation, absorption and/or other separation techniques well known to the art.

In sharp contrast to conventional prior art processes which remove CO from gaseous streams, usually through the absorption of CO by cuprous ammonium solutions, to so proceed in a power plant peak load supplying process would require enormous volumes of storage space. However, since the present invention will capture at least one molecule of CO per molecule of alkyl formate to be stored, it becomes practical to store a sufficient amount of alkyl formate for eventual release of CO fuel during peak requirements.

The alkyl formate product is passed to alkyl formate storage unit 38 where it is stored, sometimes for a substantial time period, during normal periods of power demand. During peak electric power load conditions, the stored alkyl formate is preferably passed through conduit 54 to dissociation unit 56, with the subsequently generated CO gas passing to one or more of the parallel arranged gas turbine power generating units 60 through line 58 as disclosed below.

The preferred method of producing sufficient peak load power from an alkyl formate is provided through the combustion of a substantially CO-containing fuel with air in a gas turbine, during which method the alkyl formate e.g. methyl formate, is dissociated into CO and an alkyl alcohol, e.g. methanol, prior to combustion, with the energy for dissociation preferably provided from waste heat recovered elsewhere e.g. a gas turbine electricity production unit. Liquid alkyl formate is dissociated in unit 56, preferably at a pressure suitable for entrance of CO to the gas turbine without compression. Alkyl formate is contacted with an effective catalyst, in either the liquid or gaseous phase, with the degree of dissociation being controlled by the particular catalyst and by the reaction temperature and pressure. If desired, the operation may be effected in either one step or a plurality of steps. The alkyl alcohol, e.g. methanol, product of the dissociation is separated, and preferably passed through conduit 62 to storage unit 34, where it is stored for later use.

The hot products of dissociation, e.g. carbon monoxide and methanol, after exiting dissociation unit 56 can first pass into a condensor, if necessary, to recover methanol, before the stream of essentially CO gas enters a preferred power generating gas turbine electricity production unit. It should, of course, be understood that there may be a plurality of such gas turbines in any suitable arrangement with one another. Such a turbine system is thereby adapted to produce the desired amount of peak load power.

It will be apparent to those skilled in the art that the gas turbine power units and their accompanying electric and steam generators can and will vary in both number and size, depending upon the particular capacity of the system desired. It should also be understood that more than one coal gasifier may be used in the process cycle to convert the necessary amount of coal feedstock to satisfy both peak and base load requirements. It is also a part of the invention that any excess or waste heat may be either recovered from or exchanged between various conduits or units as best benefits energy requirements. For example, sensible heat recovered from the coal gasifier can be used as a steam source for any of the steam turbine electricity producing units.

An additional variation of the process can be provided by a second source of peak load power which can be supplied through the combustion of any net liquid methanol product in a gas turbine.

The heat in the exhaust gases from the turbine generator is preferably recovered in a suitable steam generator, and a clean stack gas released to the environment. It is to be noted that it is within the scope of this invention to incorporate any suitable combustion arrangement having an alkyl alcohol as a fuel for production of a peak load power capacity, and it is wished to point out that the above disclosed cycle is merely preferred.

The following example is provided to illustrate the invention in accordance with the principles of this invention but are not construed as limiting the invention in any way except as indicated by the appended claims.

EXAMPLE I

Figure 2:
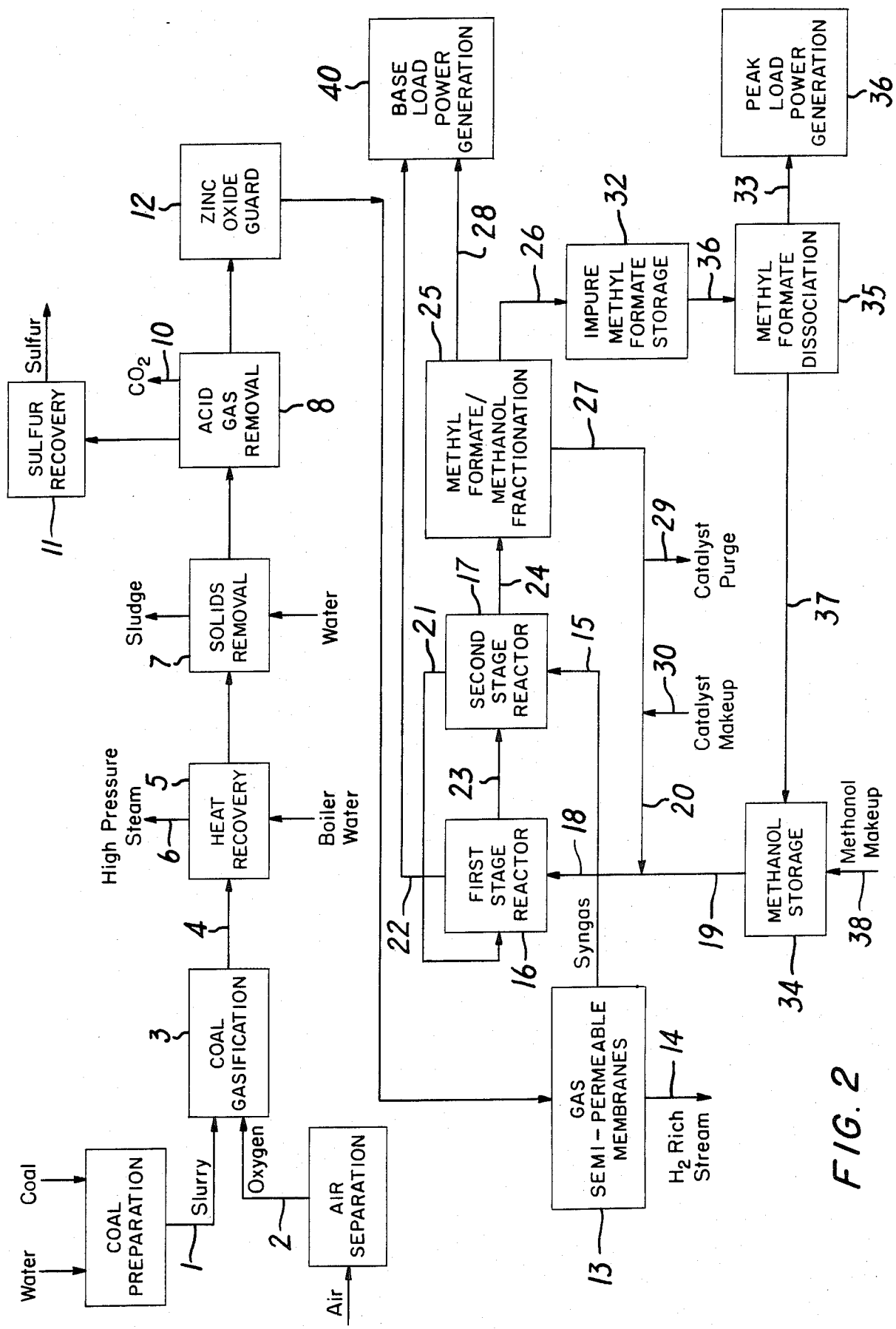
FIG. 2 describes a typical process design which is further illustrated in example 1.

The following example follows the simplified outline seen in FIG. 2. A syngas is produced by gasification in a pressurized Texaco process reactor(3) of a water slurry stream(1) comprising 66% dry weight of Illinois No. 6 coal with a stream(2) of pressurized, 98 mol % oxygen, obtained by a cryogenic separation of air. The gasification operates at a 1000 psig gasifier outlet pressure(4), and after waste heat recovery in radiant and convective boilers(5) to generate a high pressure, saturated steam stream(6) followed by removal of the syngas particulate solids in an appropriately efficient water scrubber(7), the raw, cooled syngas is at 950 psig pressure.

The prepared syngas pressure is reduced to about 830 psig before used as feed to the process, by undergoing several steps involving essentially complete removal of gaseous sulfur compounds and of $CO_2$ (8, 12) together with a step of concentrating the CO by removal(14) of a portion of the hydrogen and a lesser portion of CO in a gas semi-permeable membrane system(13), such as provided by Monsanto Inc., St. Louis, Mo., under the trade name "PRISM". The sulfur compounds and $CO_2$ are removed in an integrated system of scrubbers(8), flash steps and strippers, the unit employing a dimethyl ether of polyethylene glycol, which is a physical solvent selective for $H_2S$, as sold by Norton, Inc. under the trade name "Selexol". The sulfur present in the stream of removed gaseous sulfur compounds(9) is converted into recovered sulfur values in a Claus unit with tail gas treatment(11) so as to minimize environmental emissions of $H_2S$ and sulfur oxides. A separately recovered stream of essentially clean $CO_2$ is vented to the atmosphere(10). Residual sulfur compounds in the syngas stream are removed by chemical reaction in a zinc oxide guard bed(12). The syngas equivalent heating value in stream(14), which is separated in the membranes while concentrating the syngas stream(15) in CO is typically 25 to 30% of the total from gasification(4).

The prepared syngas feed(15) into the process of this invention has a flowrate of 45,190 pound moles per hour (MPH) and a composition of 69.6 mole % CO, 28.7 mole % $H_2$, and 1.7 mole % of other, minor and trace gaseous compounds, including nitrogen, argon, methane, and residual trace water vapor, $CO_2$, and sulfur compounds. The stream of syngas is reacted in two counter-current stages(16, 17) with a stream of impure methanol(19) in the presence of a homogeneous sodium methoxide ($NaOCH_3$) catalyst which is dissolved in the reaction mixture comprising essentially methanol and methyl formate, in a ratio of approximately 1 part by weight $NaOCH_3$ per 100 parts of methanol, as taught by U.S. Pat. No. 4,316,880. The temperature in each reactor is maintained at about 140° F. to 212° F., usually at about 175° F., to synthesize methyl formate by carbon monoxide esterification. The feed methanol(19) combined with a recycle stream(20) containing the catalyst is passed to the first stage reactor (16) where it is contacted with the gas stream(21) exiting the second stage reactor. The gas stream(22) leaving the first stage reactor is at about 820 psig total pressure and contains about 21.9 mol % CO, thus the CO partial pressure in this reactor is maintained at about 180 psi. This gas stream leaves the reactor system and becomes fuel for a base load gas turbine combined cycle power generation system(40). Approximately 86,210 MPH of impure methanol, containing approximately 110 MPH of methyl formate, the sodium methoxide catalyst, together with smaller amounts of other, minor contaminants, is fed in stream(18) to the first stage reactor. The liquid phase(23) exiting the first stage reactor is fed to the second stage reactor where it reacts with the incoming prepared syngas. The total conversion of CO with methanol to methyl formate in the two stages going from stream(15) to stream(22) is approximately 81.9%.

The liquid stream(24) exiting the second reaction stage consists of about 25,870 MPH of methyl formate and 60,460 MPH of unconverted methanol and has dissolved in it approximately 1990 MPH of CO, and 500 MPH of $H_2$. This stream is processed in a methyl formate/methanol fractionation unit(25) where it is reduced in pressure to about 300 psig to vent, through a reflux condenser, a stream of gases comprised essentially of CO and $H_2$. The liquid is further fractionated in a refluxed distillation column to vent the remaining dissolved gas and to separate crude methyl formate product in stream(26) from stream(27) containing the sodium methoxide catalyst and unreacted methanol. The combined gaseous vent streams(28) from fractionation (the one at lower pressure, from the distillation, is compressed to medium pressure) are used to supplement the fuel to the base load gas turbines(40). The distillation produces an overhead liquid stream(26) of about 90 mol % methyl formate together with about 10 mol % methanol, which is passed to methyl formate storage (32), and a bottoms stream(27) of methanol with about 0.2 mol % methyl formate and 1.5 mol % NaOCH3, which is recycled to the first methyl formate synthesis stage reactor together with 28,680 MPH of methanol(19) from the storage unit(34). From this recycle, however, is purged in stream(29) approximately 90 MPH of methanol to remove degraded catalyst species, and 4.5 MPH of methanol is added(30) together with a typically, available commercial supply of NaOCH3 to make up for this catalyst purge.

Since fuel is intermittently required for the peak load service gas turbines(33), the impure methyl formate is intermittently passed from the storage tank(32) to a vapor phase catalytic methyl formate dissociation unit(35). This unit is designed accordingly to the teachings of Takeda, (as taught in Japanese Pat. No. 77,36,309). The feed stream(36) of methyl formate/methanol, at a 28,650 MPH average flowrate (which can be, in practice, several times the average rate, depending on the required peak utilization of the stored fuel) is vaporized at near atmospheric pressure by heat transfer with the hot gas/methanol mixture from the dissociation reaction, and by the application of further outside heating. Through the addition of the outside heat the reaction temperature is maintained at about 750° F. The vapor stream is passed over a catalyst for a residence time sufficient so that the methyl formate is essentially completely dissociated and yields a stream of average flowrate of 45,620 MPH of gases, with a concentration of 48.4 mole % CO, 50.2 mole % methanol, 0.3 mole % $H_2$, 0.8 mole % CO2 and approximately 0.24 mole % of other degradation products such as dimethyl ether. Essentially all of the methanol is recovered by cooling this stream in several stages of recuperative and outside coolant heat exchange, condensing the contained methanol, and separating the uncondensed gases in a vapor-liquid separator. The resulting gas stream (33), with compression, as required by the design of the particular gas turbine used, becomes fuel for the gas turbine and approximately 27,349 MPH of the cooled, recovered methanol(37) is collected in a storage tank.

A replenishment stream(38) of approximately 1331 MPH of methanol is added to the methanol storage tank from outside sources to replace the methanol lost through degradation reactions in the methyl formate dissociation and more can be added, as required, to replace methanol lost from the process through miscellaneous pump and vent losses. The methanol in storage, which is intermittently collected as a product from the dissociation, and replenished by outside sources, as required, over time, is continuously passed as net feed(19) to the methyl formate synthesis unit.

By this method, over 50% of the chemical fuel heating value (lower, or net) in the syngas feed passed to this process in stream(15) and typically, over 35% of the total from the gasification(4), is made intermittently available in stream 33 (as required) to gas turbine systems, or other combustion devices which can utilize the predominantly CO fuel to provide for an electric utility's peak power requirements. The addition of prior or subsequent operations involving $H_2$ and/or CO-adjusting reactions to make storable liquids as herein described, can further increase the amount of peak to base load fuel. Only the transfer of liquids to and from the storage tanks (36, 37), the dissociation reaction apparatus(35), and the peaking power generators(39), operate on an intermittent schedule. All other equipment in the system is operated continuously.

EXAMPLE 2

A better understanding of the invention's theoretical advantage over the prior art can be seen by examining two simplified illustrations representing the prior art (FIG. 3) and this invention (FIG. 4), respectively, and by then applying to these two systems parameters consistent with current, state-of-the-art reaction capabilities (FIG. 5 and 6). For illustrative purpose, only relative molar streams, major reactive components and approximate conversions are considered in the following material balances. The examples also assume that the syngas in each case is to be used directly from the gasification unit with only appropriate cleaning and without employing a separate shift of the CO in the syngas to form additional $H_2$. Referring to FIG. 3, a syngas stream 70 derived from the oxygen gasification of an appropriate carbonaceous fuel is first cleaned for the requirements of the downstream process by removing essentially all sulfur gases and some CO2. The gas contains CO and $H_2$ having a molar ratio of 1.5/1 (2.5 moles total). Assuming 100% conversion in reactor 72 of $H_2$ with the required amount of CO to form a methanol stream 74 in a "once-through" reaction, 1 mole of $H_2$ and 0.5 moles of CO are converted to produce 1 mole of methanol, leaving 1 mole of CO unconverted in stream 76. Thus, 60% of the gas moles in the feed 70 will have been captured as a liquid for use in peak load power production, as desired. CO and $H_2$ have roughly equivalent combustion (lower) heating values, so the use of molar gas capture efficiency is also a more-or-less approximate measure of fuel value capture efficiency.

Referring to FIG. 4, the same syngas stream 80 is again appropriately further cleaned by essentially total removal of the CO2 and water vapor. Methyl formate is formed from CO with 100% conversion in a reaction with 1.5 moles methanol in reactor 82, leaving 1.0 mole of $H_2$ unconverted in stream 84 and forming 1.5 moles of methyl formate (86). Assuming 100% of the remaining hydrogen in 84 is reacted in hydrogenolysis unit 88 with 0.5 moles of the formed methyl formate in stream 90 to form 1 mole of methanol in stream 92, all of the syngas will have been consumed to form a liquid fuel product. Stream 94 will thus contain no moles of gas CO and $H_2$. The reactions in units 82 and 88 also consume 1.5 moles of methanol and 0.5 moles of methyl formate while producing 1 mole of methanol (92) and 1 mole of methyl formate (stream 96).

The formed 1 mole of methyl formate of stream 96 is stored in unit 98 until it is dissociated, at essentially 100% efficiency in unit 100 when desired for peak load power production, and yields 1 mole of methanol (102) and 1 mole of CO (104). The CO is available as fuel for peak load power production. One mole of this methanol formed by dissociation is recycled along with 0.5 moles of the methanol formed in the hydrogenolysis unit 88 to storage unit 106, where it provides all of the methanol feed (108) for the methyl formate synthesis. The net fuel for the peak load power production which is available from this cycle is 1 mole of CO (104) and 0.5 moles of methanol (110).

In practical processes, however, reactant conversions are not complete and there are yield and leakage losses. The art has been able to obtain at practical pressures, typically, about 50% conversion of $H_2$ in the once-through methanol synthesis. In the example shown in FIG. 5, only about 0.5 moles of $H_2$ and 0.25 moles of CO, or 30% of the syngas moles of stream 120 are converted to a storable methanol fuel (stream 122), in reactor 124, leaving 1.75 moles of total gas in stream 126.

As is illustrated in FIG. 6, for the three reactive steps illustrated in the process, at an essentially equivalent feed syngas pressure as in the example in FIG. 5, the art is able to typically obtain about 80% conversion of CO in methyl formate synthesis, about 50% conversion of hydrogen in hydrogenolysis, and essentially 100% dissociation of methyl formate. Thus, starting with feed stream 130, about 0.3 moles of CO and 1 mole of $H_2$(132) will remain unreacted from the synthesis with methanol of 1.2 moles of methyl formate (140). Then, 0.95 moles of methyl formate (144) will be stored and dissociated, as required, to methanol (146) and CO (148), and 0.25 moles of methyl formate (150) will be fed to the hydrogenolysis unit to form 0.5 moles of methanol (142) when reacted with the 0.5 moles of $H_2$ in stream 132. Since the methyl formate synthesis requires 1.2 moles of methanol (152), 0.25 moles (154) of the total hydrogenolysis product methanol (142) is used to supplement the 0.95 moles (146) from dissociation, and 0.25 moles remain as available liquid fuel (156). Of the original 2.5 moles of total syngas (130), 0.3 moles of CO and 0.5 moles of $H_2$ remain, so that 68% of the syngas will have been converted to a storable form of matter, as contrasted with 30% obtained by once-through methanol synthesis illustrated in FIG. 5.

This illustrates the substantial advance over the prior art by the process of the invention in achieving a storage of a much higher percentage of syngas heating values by the appropriately coordinated combination of the alkyl formate synthesis, alkyl formate dissociation, and liquid inventorying steps, together with hydrogenolysis just one of the several possible auxiliary liquid fuel synthesis steps which this invention prefers. Substituting or adding other of the preferred auxiliary synthesis steps of this disclosure will lead to similar improvements in the production of storable liquid fuels.

We claim:

1. A process for satisfying a variable power demand comprising:
    gasifying a substantially combustible hydrocarbonaceous material into a syngas possessing a $CO/H_2$ ratio ranging from about 3 to 1 to 1 to 3;
    preparing the syngas for reacting to form a liquid CO absorbing molecule product;
    reacting the prepared syngas with a suitable feed to form a liquid CO absorbing molecule product in a synthesis zone;
    separating the liquid CO absorbing molecule product and passing it to a first storage zone;
    passing the unreacted $H_2$ rich syngas from the synthesis zone to a power producing zone;
    passing the CO storing molecule product from the storage zone for use as a fuel source during peak demand periods.

2. A process as claimed in claim 1 wherein the combustible hydrocarbonaceous material is selected from coal, coke, lignite, oil shale, peat, biomass, petroleum refining residues and mixtures thereof.

3. A process as claimed in claim 1 wherein the $CO/H_2$ syngas ratio ranges from about 2 to 1 to 1 to 1.

4. A process as claimed in claim 1 wherein the syngas is prepared for reacting by cleaning it of impurities, gaseous sulfur compounds, $CO_2$ and water.

5. A process as claimed in claim 1 wherein the syngas is prepared by increasing its CO content.

6. A process as claimed in claim 5 wherein the CO content is increased by a once through methanol synthesis, or by utilization of a gas semi-permeable membrane concentration.

7. A process as claimed in claim 5 wherein the syngas increased in CO has a $CO/H_2$ ratio ranging from about 10 to 1 to 1 to 1.

8. A process as claimed in claim 1 wherein the CO absorbing molecule product is selected from the class of alkyl formates.

9. A process as claimed in claim 8 wherein the CO absorbing molecule product is methyl formate.

10. A process as claimed in claim 1 wherein a suitable feed for reacting with the syngas to form a liquid CO absorbing molecule product is an alkyl alcohol.

11. A process as claimed in claim 10 wherein the alkyl alcohol is methanol.

12. A process as claimed in claim 8 wherein the alkyl formate product is substantially separated from synthesis zone catalysts before passing to the first storage zone.

13. A process as claimed in claim 8 wherein the unreacted $H_2$-rich syngas exiting the synthesis zone enters a hydrogenolysis zone and reacts with an alkyl formate feed stream to form the corresponding alkyl alcohol.

14. A process as claimed in claim 13 wherein the formed alkyl alcohol is passed to a second storage zone for later usage as a feed to the synthesis zone.

15. A process as claimed in claim 14 wherein a suitable amount of the formed alkyl alcohol is periodically passed as fuel to a peak load power producing unit.

16. A process as claimed in claim 13 wherein the remaining syngas exiting the hydrogenolysis zone is passed to a gas turbine combined cycle unit.

17. A process as claimed in claim 1 wherein the power producing zone is a gas turbine combined cycle unit.

18. A process as claimed in claim 1 wherein the $H_2$-rich syngas exiting the synthesis zone is passed to a power generation fuel cell.

19. A process as claimed in claim 1 wherein the $H_2$-rich syngas exiting the synthesis zone is passed to a once-through methanol synthesis unit before passing to the power producing zone.

20. A process as claimed in claim 1 wherein at least some of the $H_2$ rich syngas exiting the synthesis zone is utilized to provide for chemical industry or refinery hydrogen requirements.

21. A process as claimed in claim 8 wherein an effective amount of stored alkyl formate is passed during peak load demand periods to a dissociation unit, and catalytically decomposes into CO and the corresponding alkyl alcohol, with the CO passing to a power producing unit, and the alkyl alcohol passing to a second storage zone.

22. A process as claimed in claim 21 wherein the power producing unit is a gas turbine electricity production unit.

23. A process as claimed in claim 13 wherein the alkyl formate feed entering the hydrogenolysis zone is supplied from the first storage zone.

24. A process as claimed in claim 1 wherein the process is carried out in a substantially continuous manner.

25. A process as claimed in claim 1 wherein the CO absorbing molecule product is easily adaptable to catalytic forming and dissociating.

26. A process as claimed in claim 21 wherein the heat required for the dissociation process is supplied from waste heat recovered in other steps of the process.

27. A process as claimed in claim 26 wherein the recovered heat is from a gas turbine electricity production unit.

* * * * *